Patented Sept. 1, 1936

2,052,995

UNITED STATES PATENT OFFICE 2,052,995

ESTERS OF TERTIARY BUTYL ACETIC ACID

Frank C. Whitmore, State College, Pa., and August H. Homeyer, St. Louis, Mo., assignors to Mallinckrodt Chemical Works, St. Louis, Mo., a corporation of Missouri No Drawing. Application November 3, 1934, Serial No. 751,417

7 Claims. (Cl. 260—106)

This invention relates to derivatives of tertiary butyl acetic acid, and with regard to certain more specific features, to ester derivatives corresponding to the type formula:

$$(CH_3)_3C.CH_2.COOR$$

wherein R is a hydrocarbon radical.

This application is in part a continuation in part of our application, Serial No. 666,512, filed April 17, 1933, and entitled "Acyl halides of tertiary butyl acetic acid," now Patent No. 2,034,850, dated March 24, 1936.

Among the several objects of the invention may be noted the provision of a series of esters of tertiary butyl acetic acid corresponding to the above type formula which all embody the therapeutic effect of the presence of the quarternary carbon atom. Other objects will be in part obvious and in part pointed out hereinafter.

The invention accordingly comprises the elements and combination of elements, and features of composition, which will be exemplified in the substances hereinafter described, and the scope of the application of which will be indicated in the following claims.

It has recently been determined that certain organic products including as a constituent thereof a quarternary carbon atom (that is, a carbon atom to which are directly linked four other carbon atoms) have valuable therapeutic properties, particularly in the field of hypnotics, sedatives, soporifics, analgesics, and bactericides and the like.

Among the products so constituted, the esters of tertiary butyl acetic acid are a most valuable group. These esters have been determined to have valuable hypnotic or sedative or soporific effects when administered therapeutically, such effects being markedly improved over similar effects obtained from analogous compounds (such as the esters of secondary butyl acetic acid) not containing the quarternary carbon atom. The enhanced effect seems to be due to the fact that the quarternary carbon atom represents the maximum degree of branching in the structure of the compound.

The esters of the present invention may be prepared, generally, in one of the two following manners:

Method A

The ester is prepared by direct esterification of tertiary butyl acetic acid with the appropriate alcohol, according to the type reaction:

$$(CH_3)_3C.CH_2.COX + ROH \rightleftarrows$$
$$(CH_3)_3C.CH_2.COOR + H_2O.$$

R in the above reaction indicates an alcohol radical.

Tertiary butyl acetic acid is obtained in pure form according to the copending application of the present inventors and Walter R. Trent, Serial No. 666,511, filed April 17, 1933, now Patent No. 2,004,066, dated June 4, 1935.

Method B

The ester is prepared by treatment of an acyl halide (for example, acyl chloride) of tertiary butyl acetic acid with the appropriate alcohol according to the type reaction:

$$(CH_3)_3C.CH_2.COX + ROH \rightarrow$$
$$(CH_3)_3C.CH_2COOR + HX.$$

R in the above reaction indicates an alcohol radical, while X indicates a halogen atom.

Tertiary butyl acyl halides are obtained in pure form according to the aforesaid copending application of the present inventors, Serial No. 666,512, filed April 17, 1933.

EXAMPLE 1

*Methyl ester of tertiary butyl acetic acid*

Tertiary butyl acetyl chloride was added slowly, in molecular proportions, to pure methanol. After warming for a short time on a steam bath, the product was washed with water, and sodium bicarbonate solution, and then dried and fractionated. The yield was practically quantitative.

The ester, which was a colorless liquid, had a boiling point of 126.5 C. under 739 mm. pressure (Cottrell apparatus); an index of refraction at 20° C., with respect to the sodium-D line, of 1.3981; and a density at 20° C., compared with that of water at 4° C., of 0.8710. Its observed molecular refraction value was 36.06 against an equal calculated value.

EXAMPLE 2

*Ethyl ester of tertiary butyl acetic acid*

This was prepared as in Example 1, using ethyl alcohol in place of the methanol.

The ester, which was likewise a colorless liquid, had a boiling point of 144.5 to 144.7° C. under 739 mm. pressure; an index of refraction of 1.4010; and a density of 0.8604. Its observed molecular refraction value was 40.70 against a calculated value of 40.68.

EXAMPLE 3

*n-Propyl ester of tertiary butyl acetic acid*

This was prepared as in Example 1, using n-propanol in place of the methanol.

The ester, which was likewise a colorless liquid, had a boiling point of 92° C. under 65 mm. pressure; an index of refraction of 1.4067; and a density of 0.8585. Its observed molecular refraction value was 45.32, against a calculated value of 45.30.

EXAMPLE 4

*Isopropyl ester of tertiary butyl acetic acid*

This was prepared as in Example 1, using isopropanol in place of the methanol.

The ester, which was likewise a colorless liquid, had a boiling point of 94° to 95° C. under 110 to 112 mm. pressure; an index of refraction of 1.4030; and a density of 0.8467.

EXAMPLE 5

*n-Butyl ester of tertiary butyl acetic acid*

This was prepared as in Example 1, using n-butanol in place of the methanol.

The ester, which was likewise a colorless liquid, had a boiling point of 91° C. under 30 mm. pressure; an index of refraction of 1.4118; and density of 0.8568. Its observed molecular refraction value was 49.97, against a calculated value of 49.92.

EXAMPLE 6

*sec-Butyl ester of tertiary butyl acetic acid*

This was prepared as in Example 1, using sec-butanol in place of the methanol.

The ester, which was likewise a colorless liquid, had a boiling point of 104° to 105° C. under 80 mm. pressure; an index of refraction of 1.4096 to 1.4100; and a density of 0.8510.

EXAMPLE 7

*4,4-dimethylpentanol-2 ester of tertiary butyl acetic acid*

This was prepared as in Example 1, using 4,4-dimethyl-pentanol-2 in place of the methanol.

The ester, which was a colorless liquid, had a boiling point of 92 to 94° C. under 7 to 8 mm. pressure; and an index of refraction of 1.4195.

This substance is of particular interest, as it contains a quarternary carbon atom in the alcohol radical as well as in the acid radical.

EXAMPLE 8

*Allyl ester of tertiary butyl acetic acid*

This was prepared as in Example 1, using allyl alcohol in place of the methanol.

The ester, which was likewise a colorless liquid, had a boiling point of 104° to 105° C. under 110 to 112 mm. pressure; an index of refraction of 1.4200; and a density of 0.8767.

EXAMPLE 9

*Benzyl ester of tertiary butyl acetic acid*

This was prepared as in Example 1, using benzyl alcohol in place of the methanol. The yield, however, was only 72–76% of theoretical.

The ester, which was a colorless oil, had a boiling point of 146 to 148° C. under 26 mm. pressure; an index of refraction of 1.4842; and was lighter than water.

EXAMPLE 10

*Bornyl ester of tertiary butyl acetic acid*

This was prepared as in Example 1, using bornyl alcohol (vorneol) in place of the methanol. The yield, however, was only 72–76% of theoretical.

The ester, which was a colorless oil, had a boiling point of 115 to 117° C. under 5 mm. pressure; an index of refraction of 1.4615; and was lighter than water.

EXAMPLE 11

*Menthyl ester of tertiary butyl acetic acid*

This was prepared as in Example 1, using menthol in place of the methanol. The yield, however, was only 72–76% of theoretical.

The ester, which was a colorless oil, had a boiling point of 114 to 115° C. under 4 to 4.5 mm. pressure; and an index of refraction of 1.4500.

Numerous other esters can be prepared by analogous methods.

In this specification the stated index of refraction values are at 20° C. with respect to the sodium-D line. The density values are at 20° C. with respect to water at 4° C. Pressure is stated in millimeters of mercury.

In view of the above, it will be seen that the several objects of the invention have been achieved and other advantageous results attained.

As many changes could be made in carrying out the above syntheses and in effecting the above compositions without departing from the scope of the invention, it is intended that all matter contained in the above description shall be interpreted as illustrative and not in a limiting sense.

We claim:

1. An ester of tertiary butyl acetic acid corresponding to the type formula:

$$(CH_3)_3C.CH_2.COOR$$

where R is an alkyl.

2. An ester of tertiary butyl acetic acid corresponding to the type formula:

$$(CH_3)_3C.CH_2.COOR$$

where R is an alkyl containing a quarternary carbon atom in its structure.

3. An ester of tertiary butyl acetic acid corresponding to the type formula:

$$(CH_3)_3C.CH_2.COOR$$

where R is a hydrocarbon radical.

4. The ethyl ester of tertiary butyl acetic acid.

5. The 4,4-dimethylpentanol-2 ester of tertiary butyl acetic acid.

6. The bornyl ester of tertiary butyl acetic acid.

7. An ester of tertiary butyl acetic acid corresponding to the type formula:

$$(CH_3)_3C.CH_2.COOR$$

where R is a substituent selected from a group consisting of alkyls, alkylenes, and aralkyls.

FRANK C. WHITMORE.
AUGUST H. HOMEYER.

Certificate of Correction

Patent No. 2,052,995.   September 1, 1936.

FRANK C. WHITMORE ET AL.

It is hereby certified that errors appear in the printed specification of the above numbered patent requiring correction as follows: Page 1, second column, line 15, in the formula, insert a period before "COOR"; line 33, for "126.5 C." read *126.5° C.*; page 2, second column, line 5, for "vorneol" read *borneol*; and that the said Letters Patent should be read with these corrections therein that the same may conform to the record of the case in the Patent Office.

Signed and sealed this 10th day of November, A. D. 1936.

[Seal]

HENRY VAN ARSDALE,
*Acting Commissioner of Patents.*